Sept. 11, 1956  J. F. MORSE  2,762,606
CABLE ELBOW FOR REMOTE MOTION TRANSFER SYSTEM
Filed Dec. 7, 1953
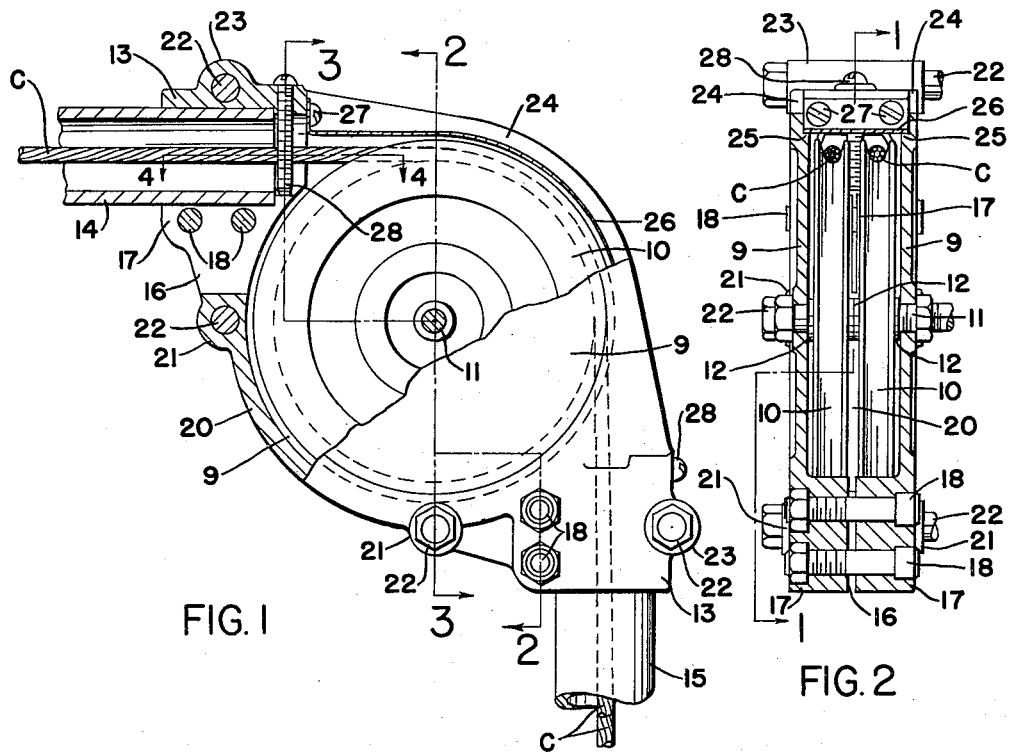
FIG. 1
FIG. 2
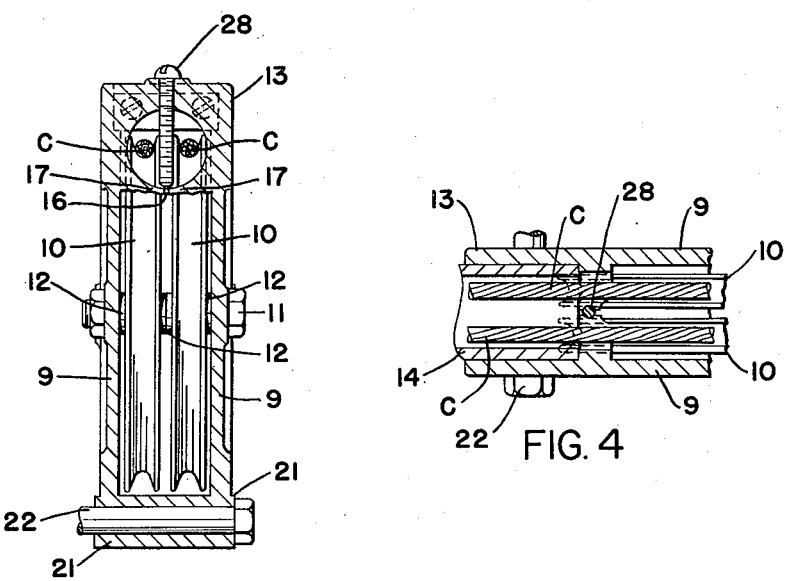
FIG. 3
FIG. 4
INVENTOR
JOHN F. MORSE
BY
ATTORNEYS

United States Patent Office 2,762,606
Patented Sept. 11, 1956

2,762,606

CABLE ELBOW FOR REMOTE MOTION TRANSFER SYSTEM

John F. Morse, Hudson, Ohio

Application December 7, 1953, Serial No. 396,694

4 Claims. (Cl. 254—190)

The invention relates generally to cable and pulley motion transfer mechanisms in which endless cables are enclosed in a conduit system having elbows at the turns. Such a motion transfer mechanism is disclosed in my copending application Serial No. 350,177, filed April 21, 1953. More particularly the invention relates to a novel and improved cable elbow construction forming part of the conduit system.

A cable and pulley motion transfer system embodies at least two strands of cables running side-by-side to form an endless cable extending from the drive end to the driven end of the system. Accordingly, each cable elbow has at least two coaxial cables positioned closely adjacent to each other over which the strands of the cables pass. There is a tendency for the strands to cross over onto the wrong pulley, especially during the threading of the cables through the conduit system or during maintenance or repair when cable tension is loosened and the covers of the elbows removed. However, any means for preventing cross over of the cables must be easily removable and replaceable so as not to interfere with the threading process.

It is an object of the present invention to provide an improved cable elbow construction having means for maintaining the cable strands in their proper paths and on their proper pulleys at all times.

Another object is to provide a novel cable elbow construction having removable separating means between the cable strands adjacent the coaxial pulleys of the cable elbow.

A further object is to provide an improved cable elbow having coaxial pulleys and novel cable separating means cooperating with said pulleys to guide the cables through said elbow.

A still further object is to provide a simple and inexpensive cable elbow construction which accomplishes the foregoing objects.

These and other objects are attained by the improvements and constructions which comprise the present invention, a preferred embodiment of which is shown by way of example in the accompanying drawing and described in detail herein. It is to be understood that various modifications of the invention and changes in details of construction may be made within the scope of the invention as defined in the appended claims.

In the drawing:

Fig. 1 is a side elevation, partly in section, of a cable elbow embodying the invention, parts of the conduits conducting the cable strands to and from the elbow being shown connected thereto;

Fig. 2 is a vertical sectional view on line 2—2, Fig. 1;

Fig. 3 is a vertical sectional view on line 3—3, Fig. 1; and

Fig. 4 is a fragmentary plan sectional view on line 4—4, Fig. 1.

The elbow shown in the drawing has two coaxial pulleys in side-by-side relation for guiding the two strands of an endless cable, but it will be understood that within the scope of the invention, four or more pulleys may be journaled in the elbow for guiding the strands of two or more endless cables, as desired. Moreover, while the elbow shown is designated for a 90° turn, the invention includes elbows designed for 45° turns or any other desired angle.

The elbow includes a housing which may be a casting having side walls 9 between which the pulleys 10 are coaxially journaled on a bolt 11 mounted in the center of the elbow and extending transversely through the side walls. The pulleys 10 are mounted in spaced relation to each other and to the side walls 9 by means of washers 12 and the like.

At each end of the housing the side walls connect with tubular portions or sockets 13 disposed at right angles to each other for receiving the ends of conduits 14 and 15 likewise disposed at right angles to each other. The conduits enclose the two strands C of an endless cable for transmitting motion through the system, the strands C passing over pulleys 10 to change direction. At their inner sides the tubular portions are slotted or separated as shown at 16 to form two clamping portions 17 which can be drawn together by bolts 18 to clamp the conduits tightly in the tubular portions 13.

A curved inner housing wall 20 extends around a peripheral portion of the pulleys between the slots 16 and connects the side walls 10. Adjacent the slots 16 the wall 20 is provided with bosses 21 having holes in which mounting bolts 22 are located for attaching the housing to suitable supports. Similar bosses 23 are provided on the outer surfaces of the tubular portions 13 for receiving additional mounting bolts 22.

The outer curved portion of the housing between tubular portions 13 is open the full depth of the pulleys 10 so that they can be inserted or removed through the opening. Thus the outer curved peripheries 24 of the side walls 9 are not connected by a housing wall, and the space between the side walls is slightly greater than the depth across both pulleys 10 mounted in working position, so that the opening between the side walls permits easy insertion and removal of the pulleys.

Preferably, the outer peripheries 24 of the side walls are provided along their inner surfaces with curved shoulders 25 on which a curved cover plate 26 is removably mounted by screws 27 attaching its ends to the tubular portions 13. The cover plate is thus quickly removed to make the pulleys 10 accessible.

The novel means for maintaining the cable strands C on the respective pulleys 10 comprises separating screws 28, which are threaded through the tubular portions 13 at the inner ends of the conduits 14, the shanks of the screws extending between the cable strands to keep them separated as they approach and leave the pulleys 10. The screws divide the socket portions into two parts, one for each strand of the cable. As shown, the outer walls of the tubular portions 13 extend toward the pulleys a substantial distance beyond the inner ends of the conduits 14 so as to provide ample stock for threading the screws therethrough, and the shanks of the screws are located in the narrow spaces between the conduits and the pulleys and closely adjacent to the pulleys. As shown in Figs. 3 and 4, the screws 28 are located in a plane parallel to and passing between the pulleys 10. Thus the screws effectively prevent either strand of the cable from crossing over on to the wrong or improper pulley.

The separating screws 28 are quickly and easily removable, which is essential in threading the cable strands through the system when it is installed or the cable replaced, because the cables must be fastened in a cable pulling terminal and pulled through the system together with a flat ribbon or wire known as "fish wire." In threading the two cables through a conduit connected to an improved cable elbow, the separating screws 28 and cover plate 26 are first removed. When the lead end is pulled through one end of the elbow, the separating screw 28 at that point is inserted between the two cable strands and tightened to prevent a cross-over of the cable strands anywhere in the section of the system just completed. After the lead ends of the strands are trained over their respective pulleys and pulled out through the other end of the elbow into the connecting conduit, the separating screw at the exit end is inserted between the two cable strands and tightened so that the two screws thus maintain the strands on their proper pulleys without crossover, and guide or maintain the strands entering and leaving the elbow in their proper paths.

The novel and improved cable elbow with its removable separating screws provides a compact and inexpensive construction which guides and maintains the cable strands on their proper pulleys and in their proper paths at all times, and especially during threading of the cables through the conduit system or when the cable tension is loosened and the cover of the elbow removed for any purpose, as for example maintenance or repair.

What is claimed is:

1. A cable elbow for a motion transfer system including a housing having side walls, at least two pulleys, means journaling the pulleys in coaxial side-by-side relation between the side walls, peripheral portions of said side walls being spaced apart to form an opening for admitting and removing said pulleys, a removable cover plate for said opening, socket portions at opposite ends of the housing disposed at angles to each other, conduits from different directions having their ends in said socket portions, means for securing said conduit ends in said sockets, and separating screws threaded through the outer walls of said sockets between said conduit ends and said pulleys and dividing said sockets into two parts for guiding separate strands of a two cable system passing through the conduits over said pulleys.

2. A cable elbow for a motion transfer system including a housing, a pair of pulleys journaled in the housing in side-by-side relation, said housing having a peripheral side opening for admitting and removing said pulleys, sockets at opposite ends of the housing disposed at angles to each other, conduits having their ends in said sockets, means for securing said conduit ends in said sockets, and separating screws extending into said sockets and dividing them into two parts for guiding separate strands of a two cable system passing through the sockets onto the respective pulleys.

3. A cable elbow for a motion transfer system including a housing, a pair of pulleys journaled in the housing in side-by-side relation, sockets at opposite ends of the housing disposed at angles to each other, conduits having their ends in said sockets, means for securing said conduit ends in said sockets, and separating screws extending into the housing between said conduit ends and said pulleys and lying in a plane parallel to and passing between said pulleys, said screws being adapted to extend between cable strands of a two cable system passing over said pulleys.

4. A cable elbow for a motion transfer system including a housing, a pair of pulleys journaled in the housing in side-by-side relation, said housing having a peripheral side opening for admitting and removing said pulleys, tubular socket portions at opposite ends of the housing disposed at angles to each other, conduits having their ends in said socket portions, means for securing said conduit ends in said socket portions, and separating screws extending into said socket portions between said conduit ends and said pulleys and lying in a plane parallel to and passing between said pulleys whereby the screws extend between the cables of a two cable system.

References Cited in the file of this patent

UNITED STATES PATENTS

| | | |
|---|---|---|
| 1,425,090 | Homan | Aug. 8, 1922 |
| 2,534,472 | Norvelle | Dec. 19, 1950 |
| 2,558,254 | Johnson | June 26, 1951 |
| 2,672,320 | Minor | Mar. 16, 1954 |